(12) United States Patent
Issler et al.

(10) Patent No.: US 11,066,039 B2
(45) Date of Patent: Jul. 20, 2021

(54) GAS GENERATOR CONTAINER AND AIRBAG MODULE

(71) Applicant: TRW Automotive GmbH, Alfdorf (DE)

(72) Inventors: Bernd Issler, Schorndorf (DE); Simon Schmid, Heuchlingen (DE); Martin Burkhardtsmaier, Schwäbisch-Gmünd (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 67 days.

(21) Appl. No.: 16/479,656

(22) PCT Filed: Jan. 25, 2018

(86) PCT No.: PCT/EP2018/051781
§ 371 (c)(1),
(2) Date: Jul. 22, 2019

(87) PCT Pub. No.: WO2018/141611
PCT Pub. Date: Aug. 9, 2018

(65) Prior Publication Data
US 2021/0039584 A1  Feb. 11, 2021

(30) Foreign Application Priority Data

Feb. 2, 2017  (DE) .......................... 102017102049.7

(51) Int. Cl.
*B60R 21/261* (2011.01)
*B60R 21/217* (2011.01)
*B60R 21/264* (2006.01)

(52) U.S. Cl.
CPC .......... *B60R 21/261* (2013.01); *B60R 21/217* (2013.01); *B60R 21/264* (2013.01)

(58) Field of Classification Search
CPC .... B60R 21/261; B60R 21/217; B60R 21/264
See application file for complete search history.

(56) References Cited

U.S. PATENT DOCUMENTS 5,106,119 A * 4/1992 Swann ................ B60R 21/2644
280/731
5,431,103 A * 7/1995 Hock ....................... C06D 5/06
102/289

(Continued)

FOREIGN PATENT DOCUMENTS

DE  2330194  12/1974
DE  7540488  4/1976

(Continued)

*Primary Examiner* — Darlene P Condra
(74) *Attorney, Agent, or Firm* — Tarolli, Sundheim, Covell & Tummino LLP

(57) ABSTRACT

The invention relates to an inflator holder (14) for an airbag module (10) comprising a holder bottom part (20) in which an inflator receiving hole (18) is formed and comprising a holder sidewall part (22) which delimits, together with the holder bottom part (20), a receiving compartment (26) for an inflator (12) open on a discharge side (28) opposed to the holder bottom part (20). The inflator holder (14) includes a filter grid (24) for exhausting gas fastened on the inflator holder (14) which filter grid at least partially delimits the receiving compartment (26) on the discharge side (28). In addition, the invention relates to an airbag module (10) comprising an airbag (16), an inflator (12) and said inflator holder (14).

15 Claims, 9 Drawing Sheets

(56) References Cited

U.S. PATENT DOCUMENTS

| | | | |
|---|---|---|---|
| 6,722,694 B1 * | 4/2004 | Nakashima | B01D 46/24 |
| | | | 280/736 |
| 2001/0006289 A1 | 7/2001 | Heilig | |
| 2004/0004345 A1 | 1/2004 | Kayser | |
| 2004/0256846 A1 | 12/2004 | Kahler et al. | |
| 2008/0012277 A1 | 1/2008 | McFarland et al. | |
| 2013/0099469 A1 | 4/2013 | Rick | |
| 2014/0054881 A1 * | 2/2014 | Fukawatase | B60R 21/26 |
| | | | 280/741 |

FOREIGN PATENT DOCUMENTS

| | | |
|---|---|---|
| DE | 19650268 | 6/1998 |
| DE | 19732825 | 2/1999 |
| EP | 0677433 | 3/1995 |
| JP | H0281747 | 3/1990 |
| JP | 2000127868 | 5/2000 |
| WO | 2014087777 | 6/2014 |

* cited by examiner

GAS GENERATOR CONTAINER AND AIRBAG MODULE

RELATED APPLICATIONS

This application corresponds to PCT/EP2018/051781, filed Jan. 25, 2018, which claims the benefit of German Application No. 10 2017 102 0497, filed Feb. 2, 2017, the subject matter of which are incorporated herein by reference in their entirety.

BACKGROUND OF THE INVENTION

The invention relates to an inflator holder for an airbag module, comprising a holder bottom part in which an inflator receiving hole is formed and comprising a holder sidewall part which, together with the holder bottom part, delimits a receiving compartment for an inflator open on a discharge side opposed to the inflator holder bottom part and is connected to the holder bottom part.

Further, the invention relates to an airbag module comprising an airbag, an inflator and an inflator holder of the afore-mentioned type.

Inflator holders and airbag modules of this type are known in the state of the art and are used especially as driver or passenger airbag modules in motor vehicles.

The inflator holder usually serves, apart from holding the inflator, also for protecting the airbag against inflator gas being directly blown at the airbag. In the case of release, the inflator thus does not blow the inflator gas directly into the airbag but initially against a wall of the inflator holder.

By blowing at the inflator holder, a slag may form on the latter, however, which in the further course of blowing may come off again.

In particular, this problem exists in multi-stage inflators. When discharging a first stage, a slag is formed which deposits on the inflator holder. When discharging a second stage, said slag then is released.

SUMMARY OF THE INVENTION

It is the object of the invention to provide an airbag module in which the slag is even better withheld. However, at the same time the flow of the inflator gas into the airbag is to be impaired as little as possible so that the airbag continues to be quickly and reliably inflatable.

The object is achieved by an inflator holder of the type mentioned in the beginning comprising a filter grid for exhausting gas fastened to a part of the inflator holder which filter grid at least partially delimits the receiving compartment on the discharge side, especially wherein the flow orifices of the filter grid have a maximum flow cross-section of from 0.2 mm$^2$ to 8 mm$^2$. The filter grid withholds slag particles and/or other impurities that may be provided in the flow of the inflator gas or are otherwise present in the inflator holder. The flow cross-sections of the flow orifices of the filter grid are designed so that there is a good compromise between maximum protection of the airbag and minimum impairment of the flow of the inflator gas. The airbag interacting with the inflator holder thus can continued to be quickly and reliably inflated.

The holder sidewall part may show a one-part design or a multi-part design.

According to a preferred embodiment, the filter grid has a degree of perforation of at least 25%, preferably at least 30%. The degree of perforation is defined as the ratio of the sum cross-section of the flow orifices to the total surface area of the filter grid. Thus, the filter grid constitutes a low flow resistance for the inflator gas. At the same time, however, sufficient filter action is ensured.

The holder sidewall part may completely encompass the holder bottom part on the outside. Consequently, the holder sidewall part is completely peripheral around the holder bottom part and laterally delimits the same to all sides. Thus, the inflator holder takes the shape of a bowl, wherein an open upper side of the bowl is provided as an exhaust side for the inflator gas and the interior of the bowl is the receiving compartment for the inflator. An inflator holder of this type is robust and reliable during operation and can be easily manufactured at low cost.

The filter grid can also be fastened directly to the holder sidewall part and forms a pre-assembled unit with the latter. The holder sidewall part is directly adjacent to the discharge side of the inflator holder which is covered at least partly by the filter grid. The filter grid thus is fastened in the vicinity of its site of action. The pre-assembled unit facilitates and accelerates the assembly. At the same time, a permanent and tight connection is ensured between the holder sidewall part and the filter grid.

In an alternative, the filter grid is fastened to the holder bottom part, in particular in the area of the inflator receiving hole. The filter grid thus encloses the inflator holder, in particular the inflator. Thus, reliable protection of the airbag and reliable filter action are guaranteed. The fastening on the holder bottom part moreover is easily accessible for mounting or dismounting.

Of preference, the filter grid completely covers the receiving compartment. The filter grid thus covers all flow paths between the inflator and the airbag. Consequently, the inflator gas is forced through the filter grid, entailing especially reliable protection of the airbag against damage and impurities.

In an alternative configuration, the filter grid is made from metal. Preferably, the filter grid is made from a woven metal grid, an expanded metal or a perforated sheet. Metal is an especially suited material as regards the mechanical and thermal load of the filter grid. The metal grid may be woven of metal fibers or wires. In the case of expanded metal, the flow orifices are initially introduced in a reduced form into a filter grid blank. The latter then is expanded, i.e. preferably lengthened in two dimensions. In this way, the desired contour and size are imparted to the flow orifices. In a perforated sheet, the flow orifices are directly introduced in the desired shape and size. A filter grid designed in this way can be easily manufactured and works permanently in a reliable manner.

In one variant, the filter grid is manufactured by deep-drawing, folding and/or beveling of a flat blank and especially is pot-shaped, preferably with a laterally projecting edge which abuts on the lower side of the holder bottom part to be fastened thereto. The flat blank is shaped so that it has the desired contour of the filter grid. For this purpose, very efficient techniques are known in prior art. Moreover, at least part of the forming steps may serve for the positive or non-positive connection of the filter grid to the inflator holder. The filter grid thus is fastened to the inflator holder in a simple and reliable manner.

The filter grid may also be pot-shaped or dome-shaped and may be inserted from a rear side of the inflator holder through the inflator receiving hole and may be fastened at said position. The inflator then is arranged inside the dome and is thus completely enclosed by the filter grid in a discharge direction. The filter grid encloses the inflator very tightly. At the same time, the inflator gas is force-guided through the filter grid. The fastening may be performed by a laterally projecting edge that is adjacent to the holder bottom part and is connected thereto.

The filter grid may be connected to the holder sidewall part and/or the holder bottom part by welding, folding, screwing, pinning, riveting, adhesive bonding and/or through-joining. Through-joining, clinching and tox clinching are understood to be synonyms in this context. The filter grid may also be fastened to the holder sidewall part and/or the holder bottom part by any other suited methods. All methods ensure reliable fastening of the filter grid on the holder sidewall part and/or on the holder bottom part.

Advantageously, the filter grid is manufactured integrally with the holder bottom part and/or the holder sidewall part, with the filter grid being especially an expanded metal portion manufactured integrally with the holder bottom part and/or the holder sidewall part. Thus, the filter grid can be manufactured very efficiently. Moreover, mounting and/or connecting steps are saved. In addition, a weight-optimized and especially light-weight inflator holder can be produced in this way, as especially connecting elements between the filter grid and the holder bottom part and/or the holder sidewall part are no longer required.

In a preferred variant, the filter grid, the holder bottom part and the holder sidewall part are integrally manufactured, wherein the filter grid, the holder bottom part and the holder sidewall part are provided in an intermediate state of manufacture of the inflator holder as a substantially flat sheet blank. In the further course of manufacture, the sheet blank is folded so that the inflator holder takes its three-dimensional shape. Thus, the manufacture thereof is especially cost-efficient and simple. When the filter grid is an expanded metal portion, an expanding operation may be carried out before folding.

In case that the filter grid is an expanded metal portion, the expanded metal portion preferably extends from a first end of the sheet blank to an end opposed to the first end. In other words, the expanded sheet blank is continuous over the sheet blank. This helps to facilitate the manufacture of the expanded metal portion as well as related expanding of the sheet blank. Also, a degree of perforation and a flow cross-section of the flow orifices of the filter grid can be easily and reliably adjusted. The inflator holder is thus adapted to reliably withhold slag without impairing flow of inflator gas in an undesired manner.

The holder bottom part and/or the holder sidewall part may be composed of plural, especially four, holder bottom segments and, resp., holder sidewall segments. A holder bottom segment or a holder sidewall segment may also be formed by an area of the filter grid, i.e. especially by an area of the expanded metal portion. When folding the sheet blank, the holder bottom segments are completed into the holder bottom part and the holder sidewall segments are completed into the holder sidewall part. For safely interconnecting the holder bottom segments and, resp., the holder sidewall segments, one or more connecting tabs may be provided.

Moreover, the object is achieved by an airbag module of the type mentioned in the beginning which comprises an inflator holder according to the invention, wherein the inflator is at least partially arranged in the inflator receiving hole, preferably at least partially fastened in the edge surrounding the inflator receiving hole. The inflator may comprise an integrated filter in addition to the filter grid of the inflator holder. The inflator gas thus is guided through the filter grid and the airbag is efficiently protected against damage and/or malfunctions. A robust and long-lasting airbag module is resulting.

The inflator is e.g. a two-stage inflator. I.e. it inflates the airbag in two stages, wherein after inflation of the first stage it is determined whether the inflation of the second stage shall be performed. Where necessary, the second stage is triggered. Thus, great safety is ensured for the occupants of a vehicle equipped with such airbag module.

In a preferred embodiment, the filter grid spans all gas flow paths between the inflator and the airbag and especially spans them completely. The gas introduced from the inflator into the airbag consequently is force-guided through the filter grid. In this way, especially high protection of the airbag is ensured.

The airbag module may be a passenger airbag module. Alternatively, the airbag module may also be a driver airbag module.

In one design alternative, the airbag, the inflator and the inflator holder are arranged in a joint housing. Hence, they form a module the installation of which into a motor vehicle and the handling of which are simple. Moreover, the components provided inside the housing are protected against undesired environmental influences.

BRIEF DESCRIPTION OF THE DRAWINGS

In the following, the invention shall be described by way of various configuration examples shown in the attached figures, wherein.

DESCRIPTION

Figure 1:
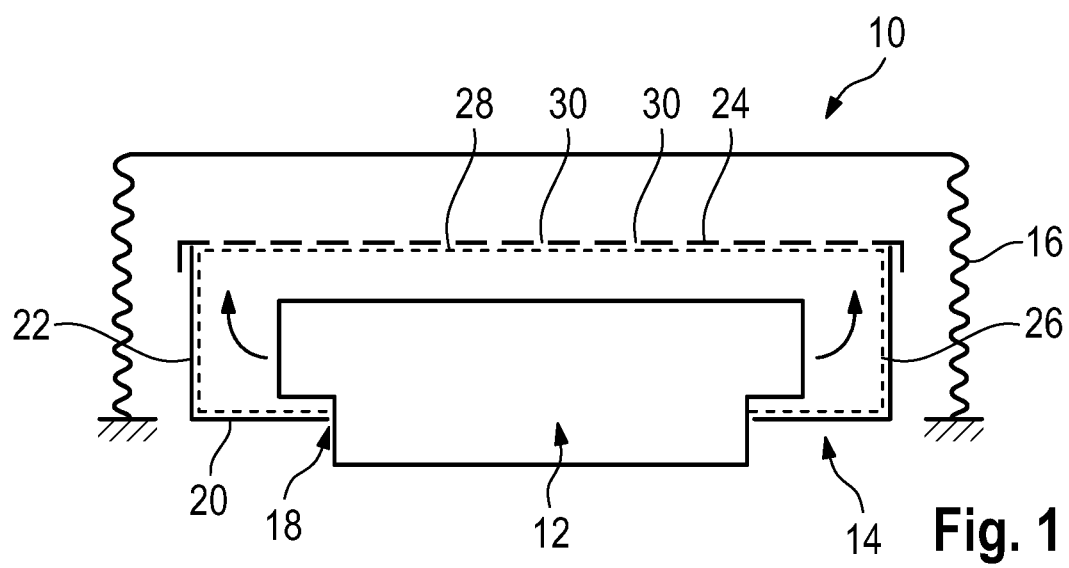
FIG. 1 schematically shows a cross-section of an airbag module according to the invention comprising an inflator holder according to the invention.

FIG. 1 illustrates an airbag module 10 comprising an inflator 12, an inflator holder 14 and an airbag 16. The inflator 12 is arranged in an inflator receiving hole 18 of the inflator holder 14 and is fastened to the edge delimiting the inflator receiving hole 18.

The inflator holder 14 comprises a holder bottom part 20, a holder sidewall part 22 and a filter grid 24 made from metal which are interconnected in the mounted state. The filter grid 24 may be fastened either to the holder sidewall part 22 or to the holder bottom part 20.

Through the filter grid 24 gas generated by the inflator 12 and exiting the latter on the side thereof may flow, as schematically illustrated by arrows.

The holder sidewall part 22 and the holder bottom part 20 delimit a receiving compartment 26 for the inflator 12, wherein a discharge side 28 of the receiving compartment 26 is open.

On the discharge side 28 the receiving compartment 26 is delimited by the filter grid 24. The filter grid 24 comprises flow orifices 30 the maximum flow cross-section of which ranges from 0.2 $mm^2$ to 8 $mm^2$. The degree of perforation of the filter grid 24 amounts to at least 25%.

For reasons of clarity, only some of the flow orifices 30 of the filter grid 24 are provided with a reference numeral.

The airbag module 10, i.e. the airbag 16, the inflator 12 and the inflator holder 14 may be arranged in a joint housing (not shown).

The inflator 12 can be a two-stage inflator 12, i.e. it can inflate the airbag 16 in two stages.

The airbag module 10 is a passenger airbag module, for example.

Figure 2:
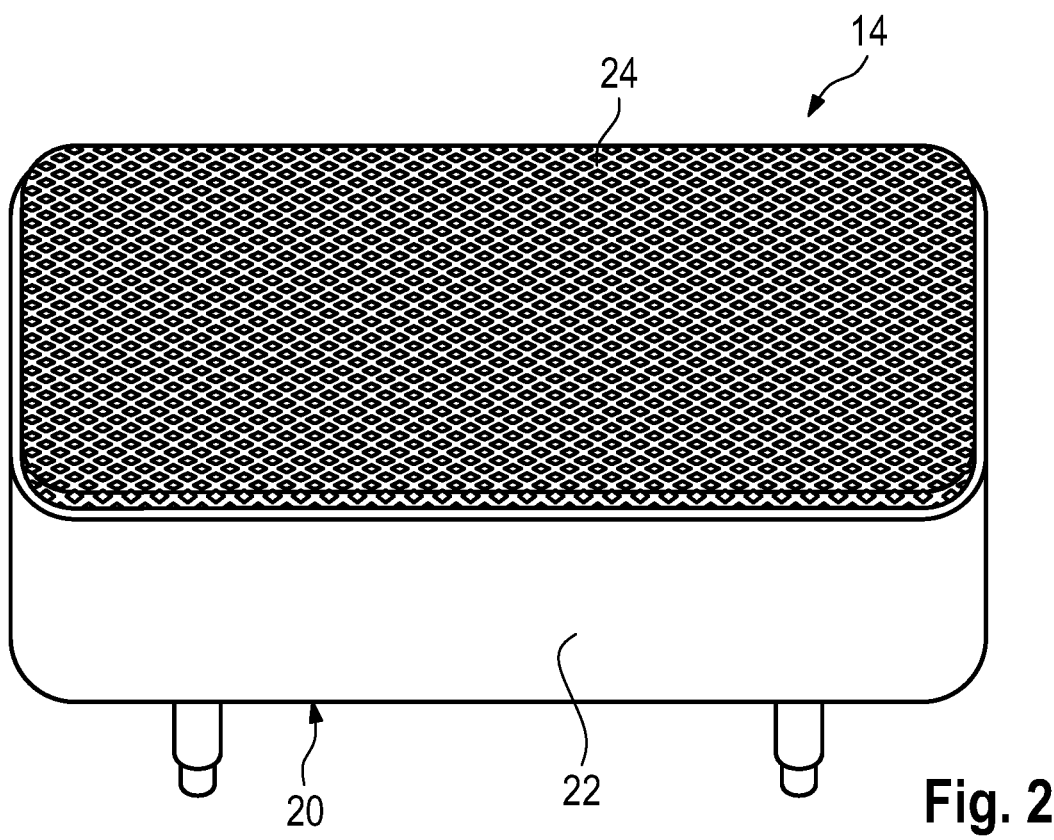
FIG. 2 shows a first embodiment of an inflator holder according to the invention in a perspective view.

In a first embodiment of the inflator holder 14 shown in FIG. 2, the holder sidewall part 22 completely encompasses the holder bottom part 20. Moreover, the filter grid 24 completely covers the receiving compartment 26.

By the complete cover the filter grid 24 completely spans all gas flow paths between the inflator 12 and the airbag 16. In other words, the gas is force-guided through the filter grid 24.

The filter grid 24 in this embodiment is fastened directly to the holder sidewall part 22, with the filter grid 24 and the holder sidewall part 22 forming a pre-assembled unit.

In the embodiment shown in FIG. 2, the filter grid 24 is made from expanded metal (see also FIG. 11) which was expanded in two dimensions starting from a blank into which the flow orifices 30 were introduced in a reduced shape.

In the embodiment according to FIG. 2, the filter grid 24 is connected to the holder sidewall part 22 by welding. Alternatively, the filter grid 24 may be connected to the holder sidewall part 22 by folding, screwing, pinning, riveting, adhesive bonding and/or through-joining.

Figure 3:
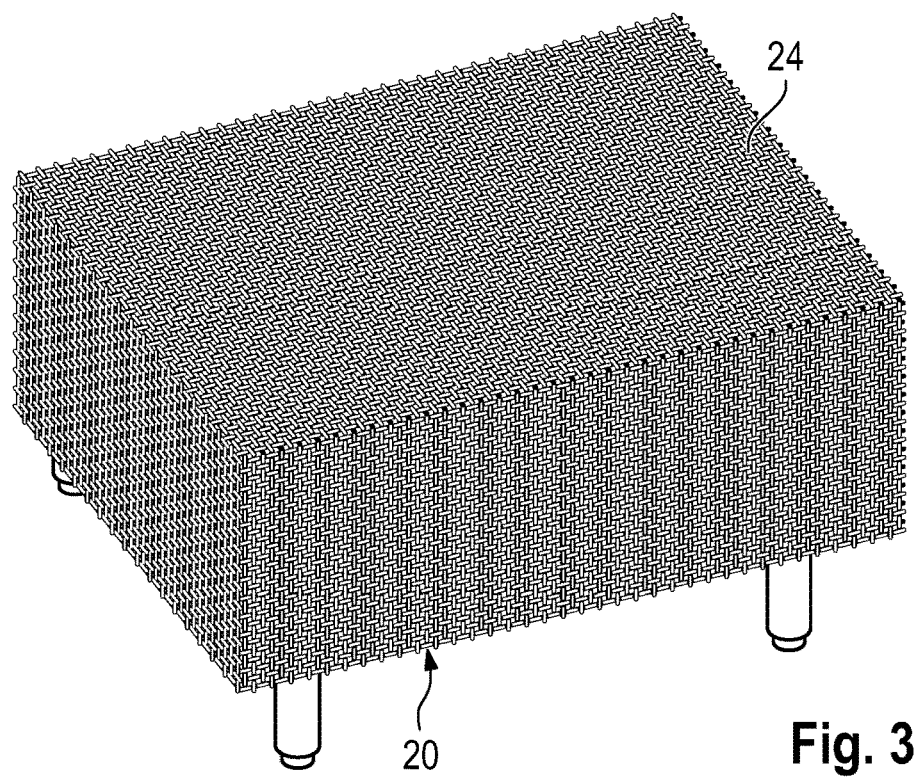
FIG. 3 shows a second embodiment of an inflator holder according to the invention in a perspective view.

In a second embodiment shown in FIG. 3, the filter grid 24 is folded around the holder sidewall part 22 and the holder bottom part 20.

Figure 10:
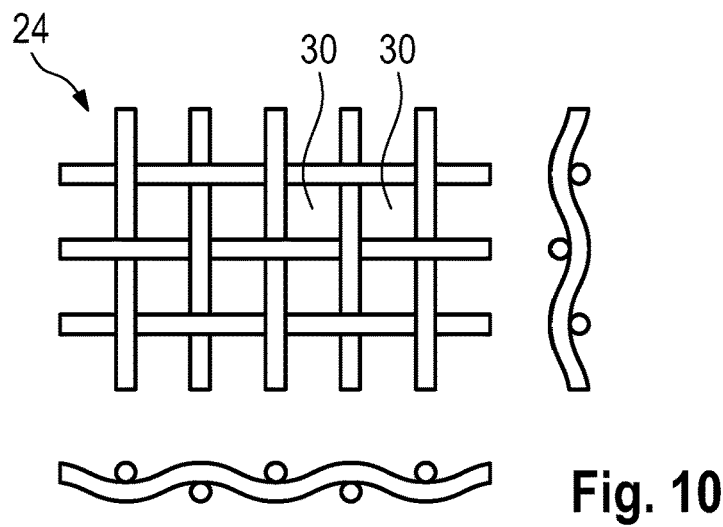
FIG. 10 shows a detail of a filter grid made from a metal grid of an inflator holder according to the invention.

The filter grid 24 in this case is made from a metal grid woven of metal wires (see also FIG. 10).

The filter grid 24 according to FIG. 3 may optionally be fastened to the holder bottom part 20 by welding, screwing, pinning, riveting, adhesive bonding and/or through-joining (not shown).

Figure 4:
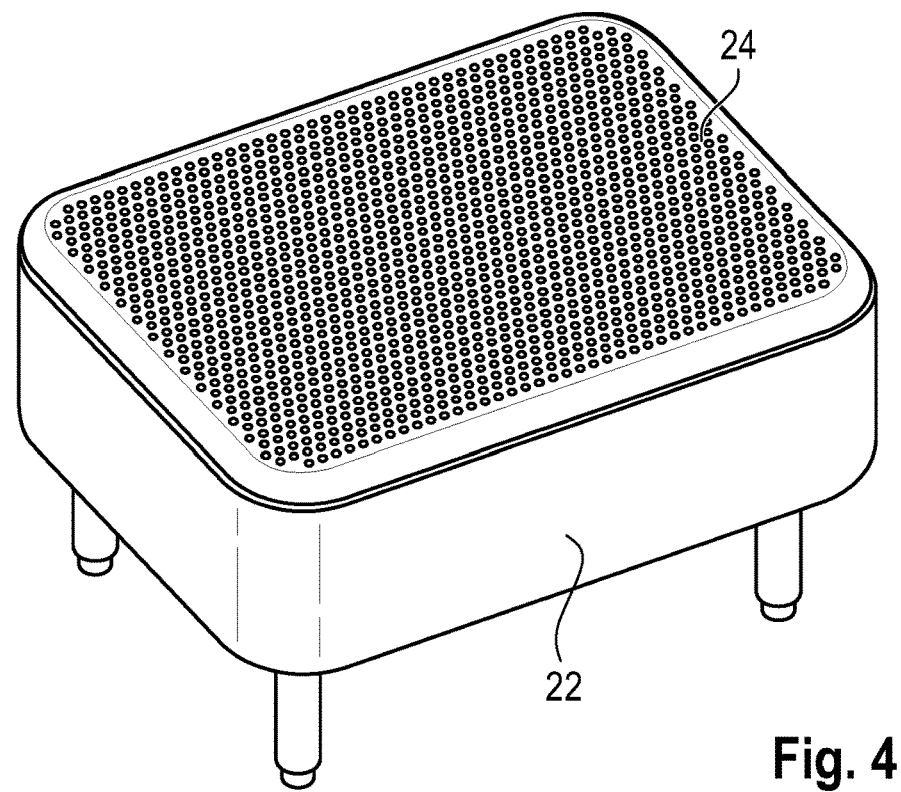
FIG. 4 shows a third embodiment of an inflator holder according to the invention in a perspective view.
Figure 12:
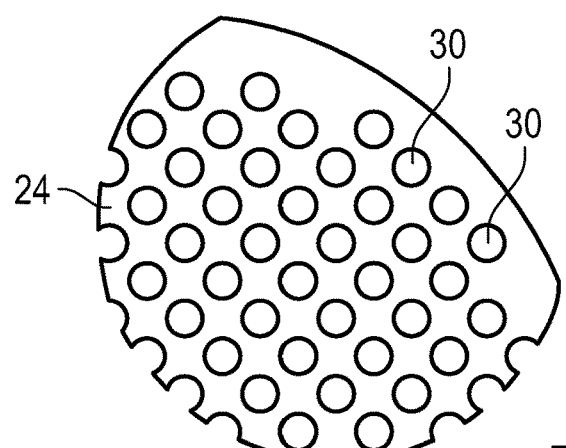
FIG. 12 shows a detail of a filter grid made from perforated sheet of an inflator holder according to the invention.

In a third embodiment which is evident from FIG. 4, the filter grid 24 is made from perforated sheet (see also FIG. 12). As in the first embodiment (see FIG. 2), it is connected to the holder sidewall part 22.

Figure 5:
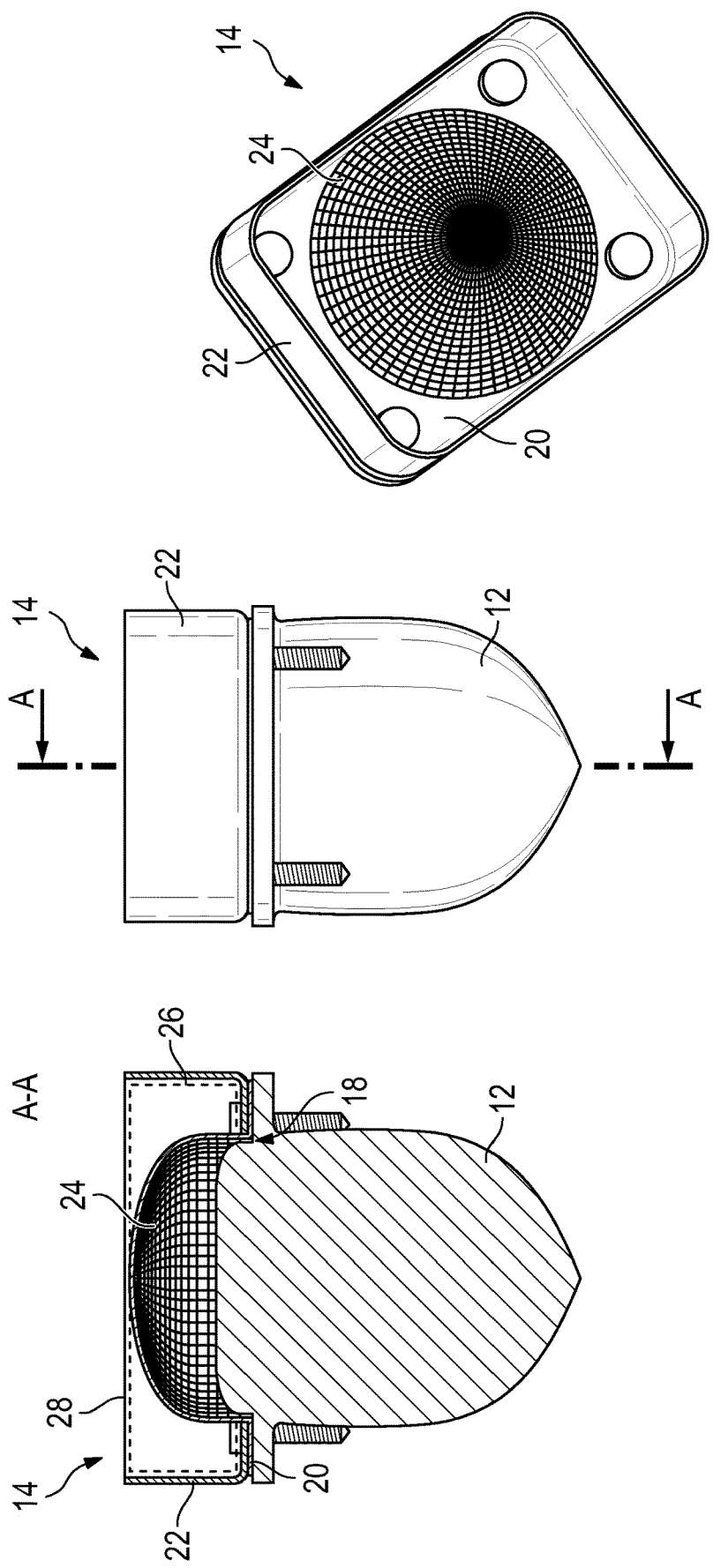
FIG. 5 shows a fourth embodiment of an inflator holder according to the invention in three different views, FIG. 6 schematically shows the manufacture of an inflator holder according to the invention in accordance with a first variant of a manufacturing method, FIG. 7 schematically shows the manufacture of an inflator holder according to FIG. 5 in accordance with a second variant of a manufacturing method, FIG. 8 schematically shows the manufacture of an inflator holder according to FIG. 3 in accordance with a third variant of a manufacturing method, FIG. 9 schematically shows the manufacture of an inflator holder according to the invention in accordance with a fourth variant of a manufacturing method.

In FIG. 5, a fourth embodiment of the airbag module 10 is shown.

The filter grid 24 in this embodiment is pot-shaped or dome-shaped. It is inserted from a side opposite to the discharge side 28 through the inflator receiving hole 18 of the holder bottom part 20 and an edge thereof is adjacent to the holder bottom part 20.

In this embodiment, the holder bottom part 20 and the holder sidewall part 22 are integrally manufactured. In addition, or as an alternative, the filter grid 24 may be manufactured integrally with the holder bottom part 20.

The filter grid 24 is fastened, in the shown example configuration screwed, to the holder bottom part 20 in the area of the inflator receiving hole 18. By the same screwing also the inflator 12 is connected to the holder bottom part 20.

In a fifth embodiment of the inflator holder 14 (see FIGS. 13 and 14), the holder bottom part 20, the holder sidewall part 22 and the filter grid 24 are manufactured in one piece.

Figure 11:
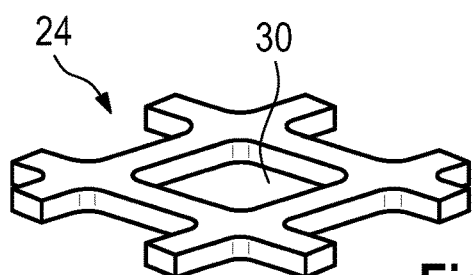
FIG. 11 shows a detail of a filter grid made from expanded metal of an inflator holder according to the invention.

The filter grid 24 shown in hatched lines is in the form of an expanded metal portion which was expanded in two dimensions after introducing the flow orifices in a reduced form (cf. FIG. 11).

Figure 13:
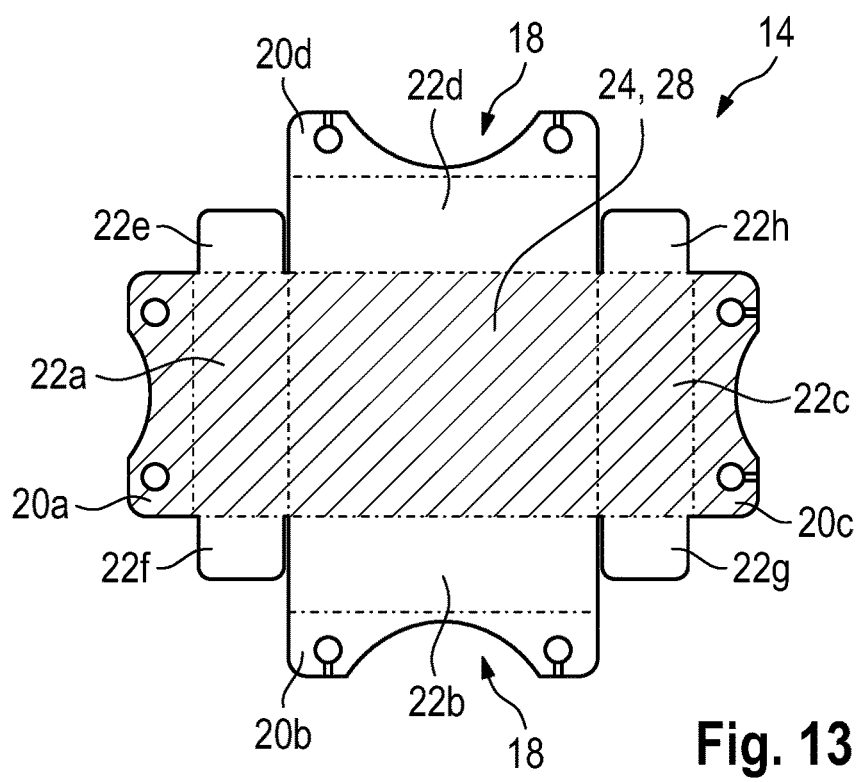
FIG. 13 shows a fifth embodiment of an inflator holder according to the invention in an intermediate state of its manufacture, the inflator holder being provided as a substantially flat sheet blank.

In order to obtain the inflator holder 14 in its final three-dimensional shape (see FIG. 14), the substantially flat sheet blank shown in FIG. 13 is folded.

Accordingly, the holder bottom part 20 is composed of four holder bottom segments denoted with 20a, 20b, 20c and 20d in FIG. 13. In the folded state, they complement one another to form the holder bottom part 20.

This applies mutatis mutandis to the inflator receiving hole 18 the peripheral areas of which are provided on the holder bottom segments 20a, 20b, 20c and 20d. They complement one another to form the inflator receiving hole 18.

In addition, on each of the holder bottom segments 20a, 20b, 20c and 20d two openings not specified in detail are provided. In the state of the inflator holder 14 shown in FIG. 14, pairs of openings arranged on respective adjacent holder bottom segments 20a, 20b, 20c and 20d cover each other. The openings may serve for interconnecting the individual holder bottom segments 20a, 20b, 20c and 20d and/or for fastening an inflator 12 not shown in detail.

The holder bottom segments 20a and 20c are formed by areas of the filter grid 24, especially of the expanded metal portion.

Figure 14:
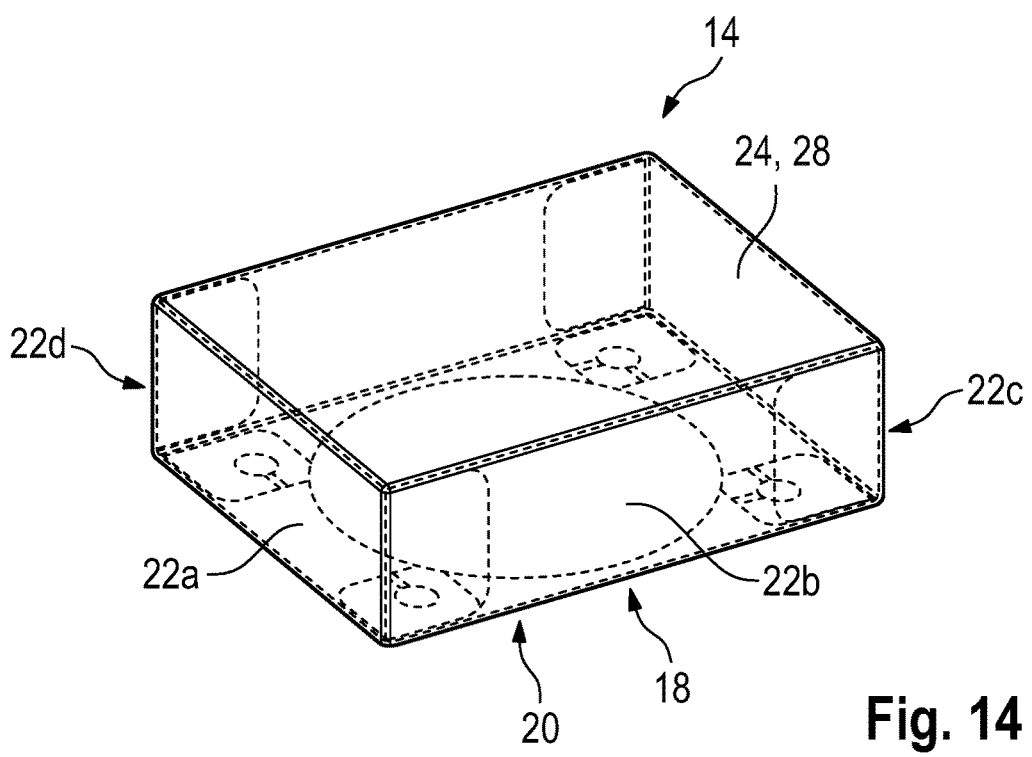
FIG. 14 shows the inflator holder from FIG. 13 in a perspective view, the inflator holder being shown in the final state of its manufacture.

The holder sidewall part 22, too, is composed of four holder sidewall segments 22a, 22b, 22c and 22d complementing one another to form the holder sidewall part 22 when the inflator holder 14 is provided in the folded state according to FIG. 14.

The holder sidewall segments 22a and 22c are formed by areas of the filter grid 24, especially of the expanded metal portion. In this way, the filter grid extends, in the state of the inflator holder 14 shown in FIG. 13, from a first end of the sheet blank shown on the left to an end opposed to the first end and shown on the right in FIG. 13. Hence, the filter grid 24, more exactly speaking the expanded metal portion, is continuous over the sheet blank.

For connecting the holder sidewall segments 22a, 22b, 22c and 22d, in addition connecting tabs 22e, 22f, 22g and 22h (cf. FIG. 13) are provided.

The latter are arranged and connected to the holder sidewall segments 22a, 22b, 22c and 22d in such a manner that the inflator holder 14 can be manufactured starting from a substantially flat sheet blank (cf. FIG. 13). In other words, the geometry of the inflator holder 14 can be developed into one plane. In a first variant of a manufacturing method for an inflator holder 14 (see FIG. 6), the holder sidewall part 22 and the holder bottom part 20 are provided as a pre-assembled or one-piece unit.

Then two opposed walls of the holder sidewall part 22 are unfolded and the filter grid 24 is placed onto the inflator holder 14 in such a way that it completely covers the discharge side 28 of the receiving compartment 26.

After that, the walls of the holder sidewall part 22 unfolded before are folded back again and the filter grid 24 is connected to the holder sidewall part 22 by screwing, pinning or riveting.

Figure 7:
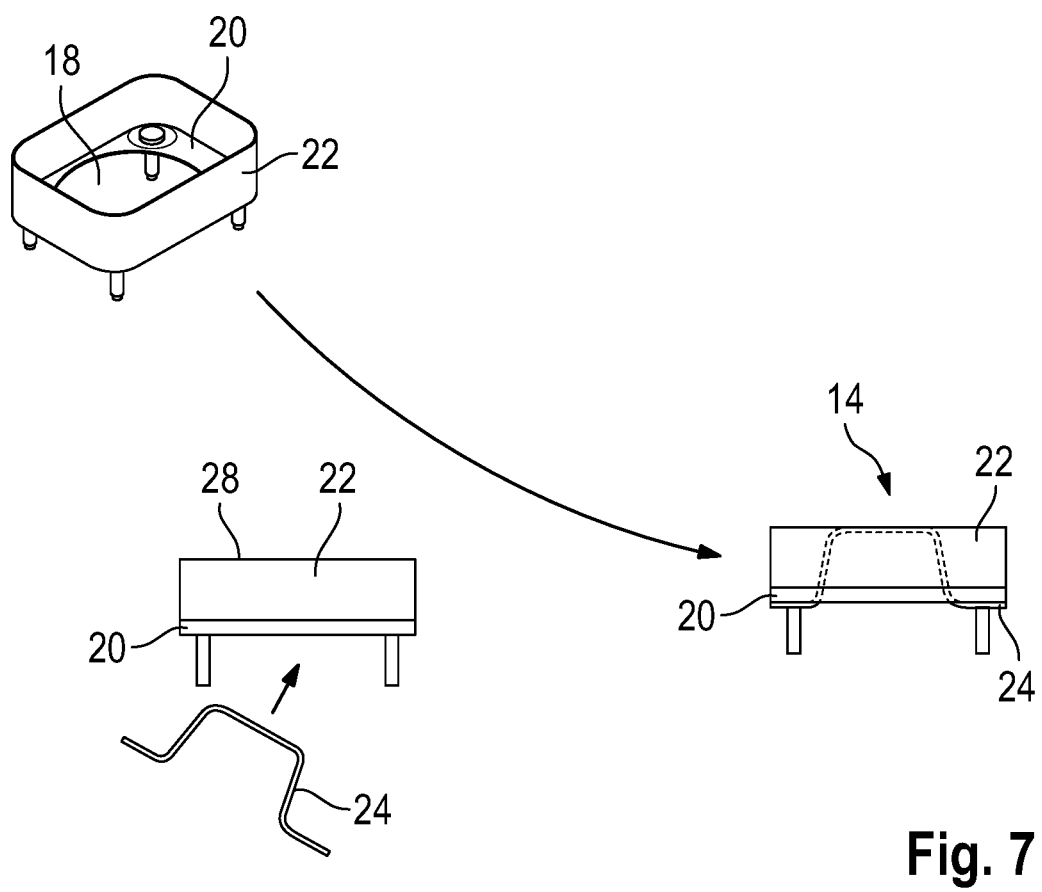

In a second variant of a manufacturing method for an inflator holder 14 (see FIG. 7), likewise the holder bottom part 20 and the holder sidewall part 22 are provided as a pre-assembled unit.

The filter grid 24 which is pot-shaped or dome-shaped in the shown embodiment (see also FIG. 5) is inserted into the inflator receiving hole 18 from a side opposed to the discharge side 28. The filter grid 24 comprises an edge by means of which it is connected to the holder bottom part 20. For this purpose, e.g. welding, folding, screwing, pinning, riveting, adhesive bonding and/or through-joining may be utilized.

Figure 8:
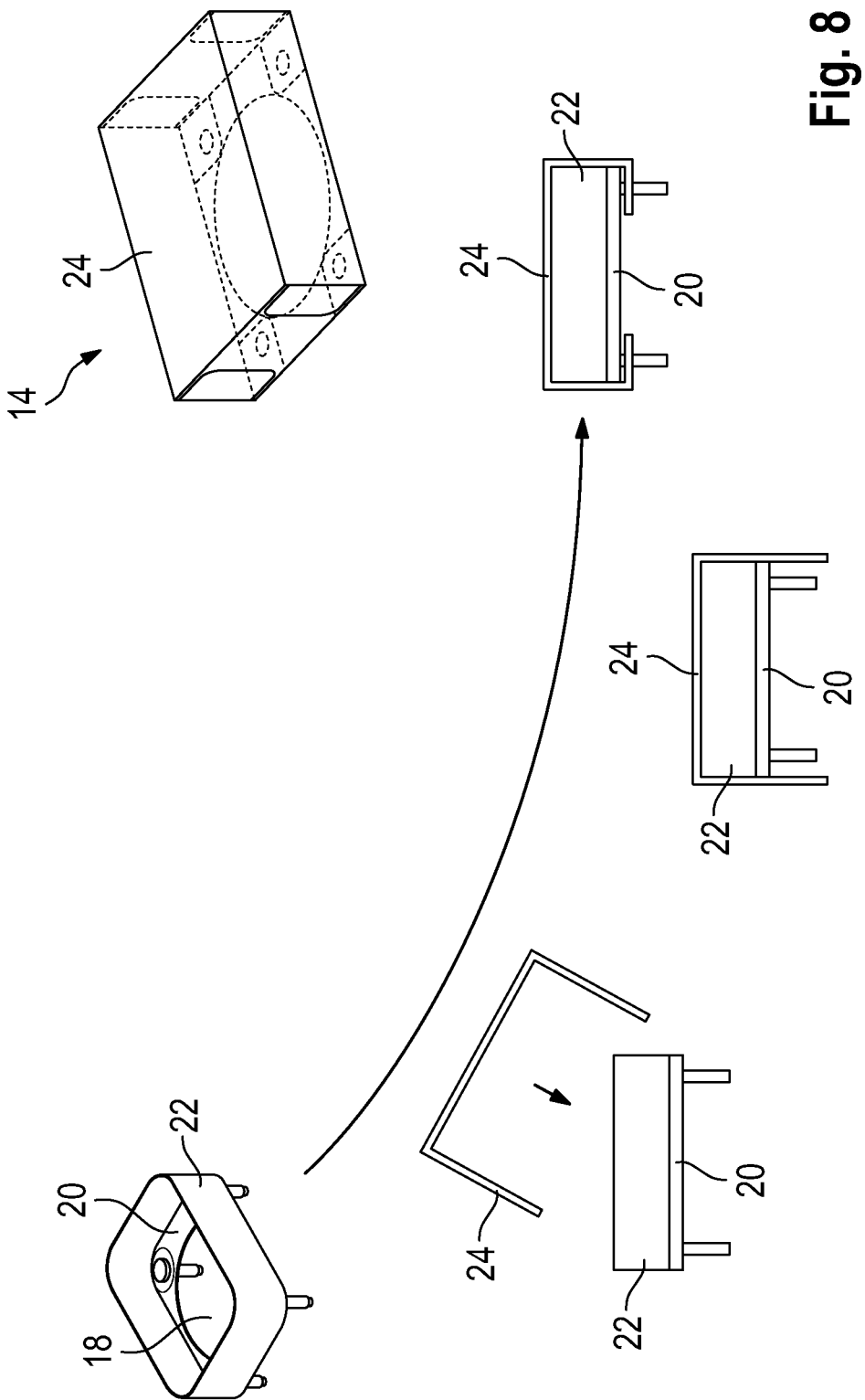

In a third variant of a manufacturing method (see FIG. 8) for an inflator holder 14, again the holder bottom part 20 and the holder sidewall part 22 are provided as a pre-assembled unit.

Then the filter grid 24 is attached to the pre-assembled unit.

In the shown embodiment, subsequently the filter grid 24 is folded around the holder sidewall part 22 and the holder bottom part 20. Already in this way, a positive connection is formed between the filter grid 24, the holder sidewall part 22 and the holder bottom part 20.

In addition, the filter grid 24 may be connected to the holder bottom part 20 and/or the holder sidewall part 22 by welding, screwing, pinning, riveting, adhesive bonding and/or through-joining.

Figure 6:
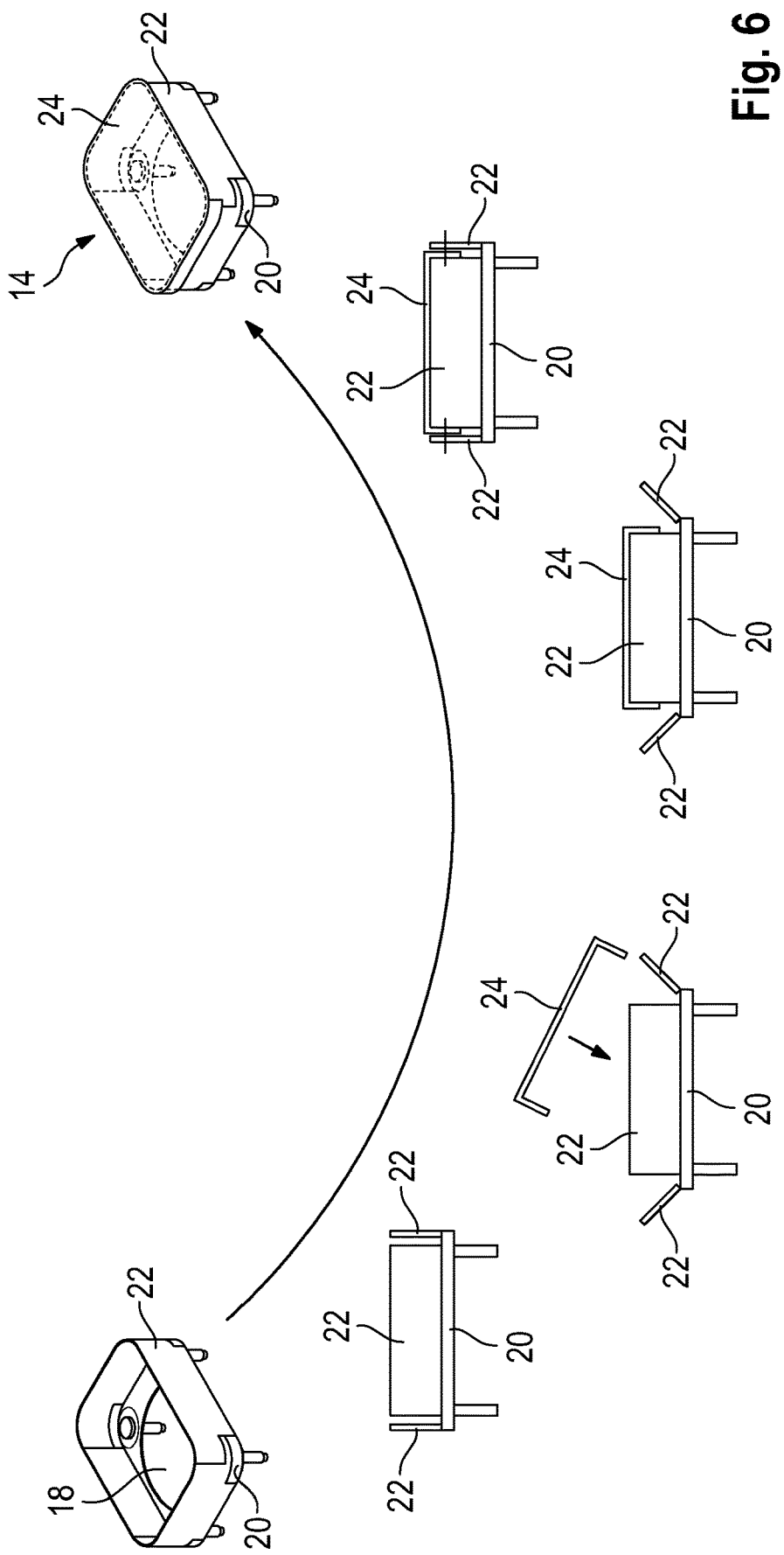
Figure 9:
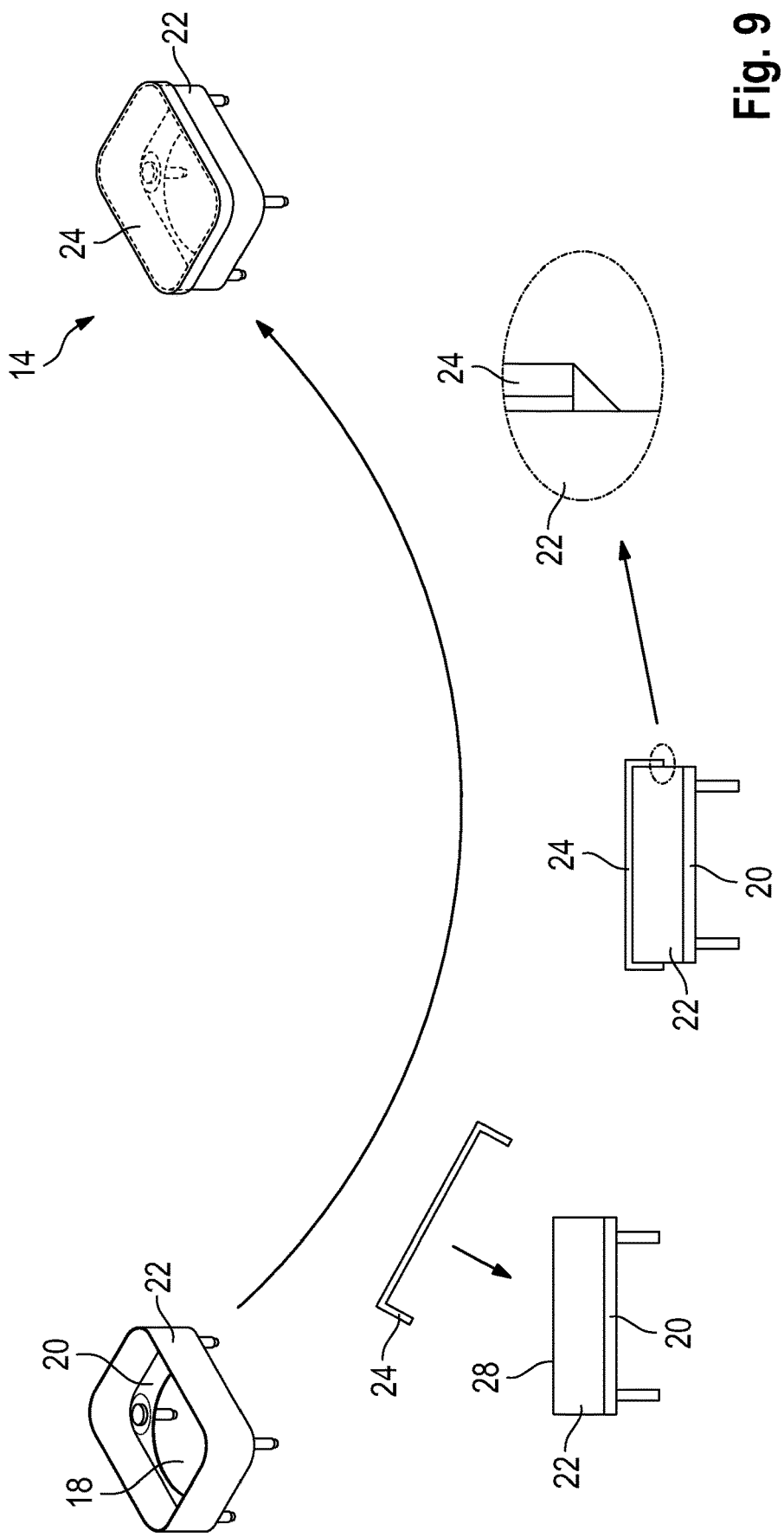

In an additional fourth variant of a manufacturing method (see FIG. 9), which is similar to the embodiment shown in FIG. 6, the holder bottom part 20 and the holder sidewall part 22 are provided as a unit as before. Then the filter grid 24 is put onto the holder sidewall part 22 on the discharge side 28. After that, the filter grid 24 is welded to the holder sidewall part 22.

All embodiments have in common that the filter grid 24 is manufactured by deep-drawing, folding and/or beveling of a flat blank.

The invention claimed is:

1. An inflator holder (14) for an airbag module (10), comprising a holder bottom part (20) in which an inflator receiving hole (18) is formed and comprising a holder sidewall part (22) which, together with the holder bottom part (20), delimits a receiving compartment (26) for an inflator (12) open on a discharge side (28) opposed to the holder bottom part (20) and is connected to the holder bottom part (20), wherein the inflator holder (14) comprises a filter grid (24) for exhausting gas fastened on part of the inflator holder (14), wherein the filter grid (24) is formed from an expanded metal portion manufactured integrally with the holder bottom part (20) and/or the holder sidewall part (22) and delimits the receiving compartment (26) on the discharge side (28), in that the filter grid (24) completely covers the receiving compartment (26), and wherein flow orifices (30) of the filter grid (24) have a maximum flow cross-section ranging from 0.2 mm$^2$ to 8 mm$^2$.

2. The inflator holder (14) according to claim 1, wherein the filter grid shows a degree of perforation of at least 25%.

3. The inflator holder (14) according to claim 1, wherein the filter grid shows a degree of perforation of at least 30%.

4. The inflator holder (14) according to claim 1, wherein the holder sidewall part (22) completely encompasses the holder bottom part (20) on the outside.

5. The inflator holder (14) according to claim 1, wherein the filter grid (24) is manufactured integrally with the holder bottom part (20) and directly fastened on the holder sidewall part (22) and with the latter forms a pre-assembled unit.

6. The inflator holder (14) according to claim 1, wherein the filter grid (24) is manufactured integrally with the holder bottom part (20) and fastened on the holder bottom part (20).

7. The inflator holder (14) according to claim 1, wherein the filter grid (24) extends to the area of the inflator receiving hole (18).

8. The inflator holder (14) according to claim 1, wherein the filter grid (24) is manufactured by deep-drawing, folding and/or beveling of a flat blank.

9. The inflator holder (14) according to claim 8, wherein the flat blank is pot-shaped and comprises a laterally projecting edge which abuts on the lower side of the holder bottom part to be fastened thereto.

10. The inflator holder (14) according to claim 1, wherein the filter grid (24) is connected to one of the holder sidewall part (22) and the holder bottom part (20) by welding, folding, screwing, pinning, riveting, adhesive bonding and/or through-joining.

11. The airbag module (10) according to claim 10, wherein the inflator (12) is a two-stage inflator (12).

12. The airbag module (10) according to claim 10, wherein the filter grid (24) spans all gas flow paths between the inflator (12) and the airbag (16).

13. The airbag module (10) according to claim 10, wherein the airbag module (10) is a passenger airbag module.

14. An airbag module (10) comprising an airbag (16), an inflator (12) and an inflator holder (14) according to claim 1, wherein the inflator (12) is arranged at least partially in the inflator receiving hole (18).

15. An airbag module (10) comprising an airbag (16), an inflator (12) and an inflator holder (14) according to claim 1, wherein the inflator (12) is arranged at least partially in the inflator receiving hole (18) and is fastened at least partially on the edge of the inflator receiving hole (18).

* * * * *